Feb. 3, 1959  C. E. HONEYWELL  2,872,536
CONTROL APPARATUS
Filed Sept. 10, 1956  3 Sheets-Sheet 1
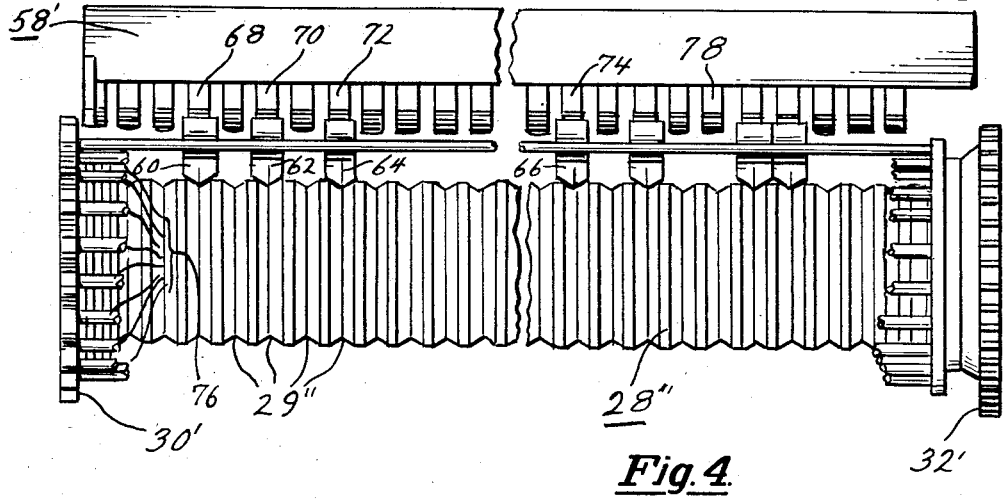
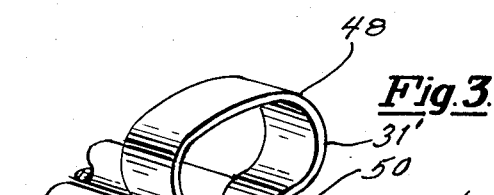
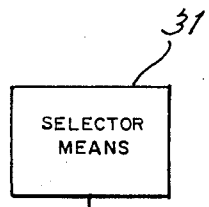
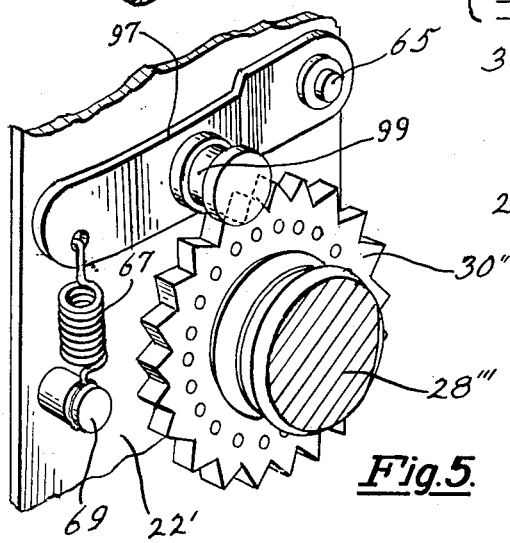
INVENTOR.
Charles E. Honeywell
BY
Donald W. Phillion
HIS ATTORNEY Feb. 3, 1959

C. E. HONEYWELL
CONTROL APPARATUS 2,872,536

Filed Sept. 10, 1956

INVENTOR.
Charles E. Honeywell
BY
Donald W. Phillips
HIS ATTORNEY

INVENTOR.
Charles E. Honeywell
BY
Donald W. Phillion
HIS ATTORNEY 2,872,536
Patented Feb. 3, 1959

2,872,536

CONTROL APPARATUS

Charles E. Honeywell, Park Ridge, Ill., assignor to Admiral Corporation, Chicago, Ill., a corporation of Delaware Application September 10, 1956, Serial No. 608,933

22 Claims. (Cl. 200—18)

This invention relates generally to control apparatus, and more specifically to an improvement in control apparatus for connecting various combinations of a plurality of first terminals to various combinations of one or more pluralities of second terminals.

In the prior art there are various applications for completing certain preselected combinations of a plurality of circuits. Usually these preselected combinations of completed circuits represent intelligence in a coded form. The code employed can be any suitable code that is expressable in terms of combinations of opened and closed circuits. An example of a specific application for such control apparatus is in the field of communication between an aircraft and a ground station. In a modern commercial or military plane it is necessary to give and/or receive information to and/or from many different ground stations for many different purposes during the course of a flight. For obvious reasons of interference ground stations located in the same general geographical area must have their transmitting and receiving equipment tuned to operate at different carrier frequencies. Consequently, the aircraft must have radio equipment which can be switched quickly to transmit or receive on a number of preselected carrier frequencies in accordance with the particular station with which the operator is communicating. The specific carrier frequency can be determined in accordance with the particular combination of completed circuits. The number of possible combinations of completed circuits is, of course, determined by the number of circuits in accordance with the laws of permutations and combinations. If, for example, there are fifteen circuits, the possible combinations will be $(2)^{15}$. However, it has been found that in the example of air to ground communication set forth herein, twenty preselected combinations are usually sufficient for a normal flight. In the prior art devices these preselected combinations can be preset so that the operator can select any one thereof by the manipulation of a single control knob. It is to be noted, however, that any particular group of twenty preselected carrier frequencies would, in most cases, be applicable to only one flight route. Consequently, it is desirable that the control apparatus be constructed so that many hundreds of different groups of preselected combinations of completed circuits can be set up thereby. In addition to the functions described above, it is further desirable to provide means whereby the operator can set up individual combinations other than the twenty preselected combinations. All of the above-mentioned functions are performed effectively by the prior art devices.

More specifically, the prior art structure comprises a plurality of first switching means which are constructed when closed to connect individual ones of a plurality of first terminals to individual ones of a plurality of second terminals. A selector means positioned adjacent said first switching means has a plurality of positions (twenty, for example), and is constructed and arranged to cause preselected combinations of said switching means to be closed automatically, in accordance with the particular position of said selector means. The said switching means is constructed to be responsive to one given position of the selector means to cause the said plurality of first terminals to be completely disconnected from said second terminals and to be connected to a second switching means. The second switching means is constructed to enable an operator to select manually various combinations of completed circuits other than those selected automatically by said selector means.

However, the above-mentioned prior art structure is heavy, bulky, and expensive. This weight and bulk are particularly disadvantageous when the equipment is employed in aircraft. For example, to carry one additional pound of gear, several additional pounds must be added to the structural weight of the plane, at a cost of about 200 dollars per additional pound of structural weight. This added weight will, of course, decrease the range and manueverability of the aircraft. Further, since space must be provided to accommodate gear, the size of the aircraft will increase as the bulkiness of the gear increases, thus also increasing the cost of the aircraft and tending to decrease its speed and manueverability. It can be seen, therefore, that any reduction in the weight or bulk of airborne gear is of considerable importance, both as to the effectiveness of the plane (range and manueverability) and also costwise. In addition to the adverse effects that the bulk and weight of prior art devices have on the aircraft, it is to be noted that the cost of the prior art control apparatus is, in itself, high. Specifically, one of the heavier and bulkier portions of the prior art control apparatus is the selector means, and the switching means responsive thereto for completing various preselected combinations of circuits. It would mark a definite improvement in the art to provide a selector means and switching means for the purpose mentioned above, whose weight and volume are considerably less than the weight and volume of the prior art structures.

An object of the invention is to provide a selector means and switching means responsive thereto for automatically completing different preselected groups of circuits; the weight, volume, and cost of said selector means and switching means being about one-fifth that of the prior art structure.

A further object of the invention is to provide a selector means whose weight is about one-fifth that of the lightest known similar prior art device.

A third purpose of the invention is to provide a selector means whose volume is about one-fifth that of the prior art devices.

Another aim of the invention is to provide a control means for automatically and manually completing different groups of circuits whose volume is considerably less than that of the prior art structures.

A fifth purpose of the invention is the general improvement of control apparatus for completing various preselected combinations of circuits of a plurality of circuits.

In accordance with the invention, there is provided the combination of a first bank of switches, a second bank of switches, and a selector means comprising a rotatable drum positioned adjacent the banks of switches and having a plurality of columns of depressions arranged circumferentially around said drum on the surface thereof. A plurality of wire-like members are mounted rigidly with respect to said drum in such a position as to be substantially parallel to the axis of said rotatable drum at substantially equal distances from the surface of said drum and at substantially equal distances from each other. A plurality of clips are self-supported between and slidably engaged between adjacent ones of said wire-like members to form a plurality of rows of clips. Each of said clips is constructed to have one end formed into a configuration which protrudes out beyond the wirelike elements and to have the other end seat in one of said depressions.

The clips are adjustable to various positions along the drum, such that each clip of each row of clips can be positioned to activate a particular switch of the first bank of switches as the drum is rotated. In this manner, each row of clips can be made to cause a predetermined combination of terminals of a plurality of first terminals to be connected to a predetermined combination of terminals of a plurality of second terminals.

In accordance with a feature of the invention, one of the rows of clips protrudes out beyond the wire-like members farther than the other rows of clips. This particular row of clips can be employed to operate the second bank of switches which function to disconnect completely the plurality of first terminals from the plurality of second terminals and connect them to a third switching means. This third switching means can be constructed to be manually controllable by an operator to connect selectable ones of said first terminals to individual ones of said second terminals, or to individual ones of a plurality of third terminals, if desired.

In accordance with another feature of the invention, the clips are constructed of a flat spring material and are formed so that when they are positioned between adjacent wire-like elements they will be held therebetween by virtue of their functioning as a compressed spring.

It is to be noted that the selector means constitutes a subcombination of the invention and could be employed to perform functions other than operating switches to complete preselected combinations of a plurality of circuits.

These and other objects and features of the invention will be more fully understood when read in conjunction with the drawing, in which:

Fig. 1 is a block diagram of a circuit illustrating, generally, the overall function of the invention;

Fig. 3 is a detailed perspective view of a typical clip showing how one end thereof is held between adjacent wire-like elements and how the other end is seated in a groove on the surface of the rotatable drum;

Fig. 4 shows a side view of the selector means and the bank of switches with special emphasis on the relationship between the co-action therebetween;

Fig. 5 is a detailed perspective view of the end portion of the selector means;

Figure 6:
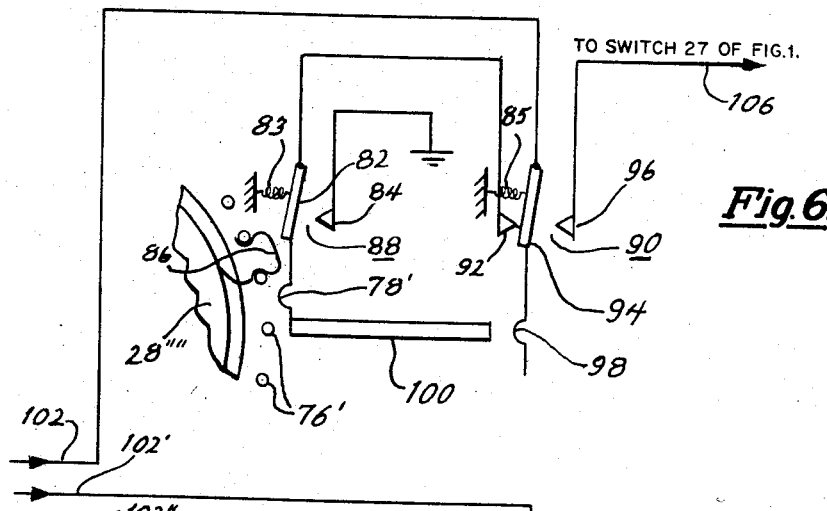
Figure 7:
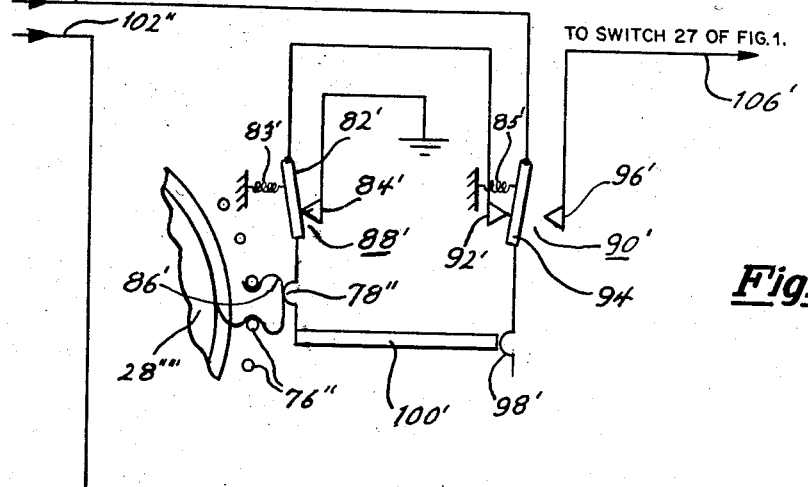
Figure 8:
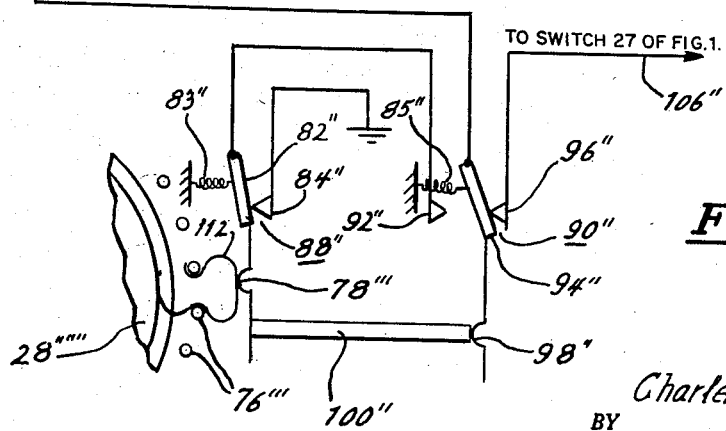

Figs. 6 and 7 are illustrations of an individual switch of the banks of switches when such an individual switch is not actuated by a clip of the selector means and when such a switch is actuated by a clip of the selector means; and Fig. 8 is an illustration of an individual switch of the bank of switches when the individual switch is actuated by one of the clips of the row of clips which protrudes beyond the wire-like elements farther than the clips of the other rows of clips.

In order to facilitate a better understanding of the invention, a general description of its purpose will first be explained with the aid of Fig. 1. Assume that each of the incoming conductors 21 (also referred to herein as first terminals) is either connected to, or disconnected from, an individual one of the output conductors 23 (also referred to herein as second terminals) by means of a switch individual thereto, in accordance with whether said switch is closed or opened. These switches are contained within the block 29 and are controlled mechanically by the selector means 31. Such mechanical control is indicated by the line 33. The selector means has a number of positions and in each of these positions will function to cause a preset combination of switches of the bank of switches 29 to be closed automatically. In the prior art devices and in the present invention, the different positions of the selector means are selected by the manipulation of a single control knob.

In the block 29 there is contained a second bank of switches which is responsive to one particular position of the selector means to cause all of the incoming conductors 21 to be disconnected from the output conductors 23 and to be connected individually to individual ones of the conductors 35, which in turn are connected to the terminals of the switch 27. The switching means 27 is not a part of the invention and will not be described in detail here. Generally speaking, however, the function of switching means 27 is to enable the operator, through the manipulation of several control knobs, to connect individual ones of the conductors 35 to individual ones of the conductors 25, in selectable combinations of the operator's choice. It is to be noted that each of the conductors 25 is connected to one of the conductors 23. Thus, in effect, the switching means 27, which permits the operator to select manually any one of many combinations of completed circuits by the use of several control knobs, is substituted for the bank of switches 29 and the selector means 31, which enable the operator to select only a relatively few preset combinations of selected circuits.

For a detailed description of a type switch which is eminently suited to perform the function required by block 27, reference is made to the co-pending application filed September 20, 1956 by Charles E. Honeywell, having the Serial Number 610,915, and entitled Detent Mechanism, and which is hereby incorporated as a part of this specification. Other type switches can, of course, be employed.

It is to be noted at this point that corresponding parts or elements in the various figures will be identified by the same reference characters, although primed, double-primed, etc., in succeeding figures.

Figure 2:
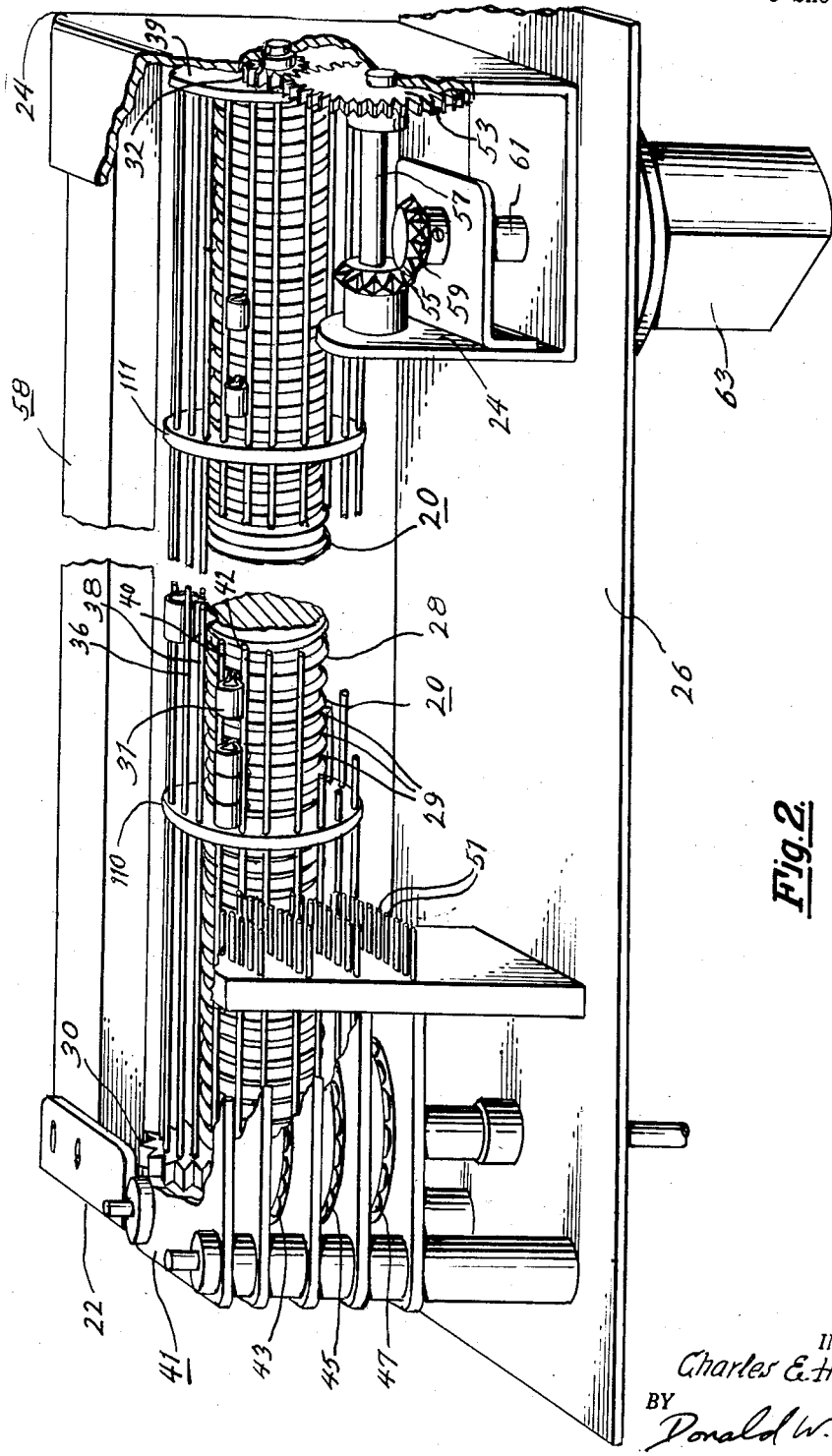
Fig. 2 is a perspective view of the control apparatus including the invention with portions broken away.

Referring now to Fig. 2, the rotatable drum structure 20 is mounted between end brackets 22 and 24, which in turn are mounted upon the plate 26. The drum structure 20 comprises an inner drum 28, which may be hollow or solid, and which has a number of grooves, such as grooves 29, circumferentially arranged around the surface thereof. One end of each of the clips, such as clip 31, seats into one of these grooves in a manner which will be described in more detail later. The ratchet gear 30 is fastened securely to one end of the grooved drum 28 and the gear 32 is fastened securely to the other end of the drum. Each of the wire-like members, such as members 36, 38, 40, and 42, are held in position at one end by small depressions provided therefore in the gear 30, at the other end by the disc 39 which is mounted securely to the drum 28, and in the middle portions by the supporting discs 110 and 111. These wire-like members are arranged substantially parallel to, and equidistant from, the axis of the drum 28, and substantially equidistant from each other.

Referring now to Fig. 3, there is shown in detail how the clips, such as clip 31', fit in between adjacent wire-like members, such as members 40' and 42'. It will be noted that one end of the clip 31' is formed to have a portion 48 which extends out beyond the wire-like members 40' and 42'. There are two semicircular portions 50 and 52 which are formed to receive the wire-like elements 40' and 42', which thereby support the clip 31'. The end 46 of the clip is designed to seat into one of the grooves, such as groove 29', on the surface of the drum 28'. If desired, the clip 31' may be pushed to the right or to the left to become seated in other grooves. A desired number of these clips may be positioned between each adjacent pair of wire-like elements, thus forming a plurality of rows of clips.

Referring again to Fig. 2, the block element 58 represents two banks of switches. In the form of the invention shown herein, individual switches of the first bank of switches are each aligned with one of the grooves in the drum 28, so that when a clip is seated in a particular groove the switch aligned therewith will be actuated. An illustration of this is shown in Fig. 4. The clips, such as clips 60, 62, 64, and 66, which are held between the wire-like elements generally identified by reference character 76, are seated in selected grooves, such as grooves 29'' of drum 28'' and are each aligned with one of the elements, such as elements 68, 70, 72, and 74 of the bank of switches 58'. There is no clip aligned with the element 78. It can be seen that in the drum position shown, the clips, such as clips 60, 62, 64, and 66, will depress the elements 68, 70, 72, and 74, respectively, whereas the element 78 will not be depressed. The depressed elements 68, 70, 72, and 74, each function to actuate an associated switch. For a more detailed description of this switching arrangement, reference is made to Figs. 6, 7, and 8.

Figs. 6, 7, and 8 illustrate three conditions which can exist between the elements, such as elements 68, 70, 72, 74, and 78 (Fig. 4), and the clips, such as clips 60, 62, 64, and 66. Although only one switch of the plurality of first switches and one switch of the plurality of second switches is shown in each of the Figs. 6, 7, and 8, it is to be understood that many such pairs of switches are positioned side by side in the bank of switches 58' (Fig. 4). Fig. 6 illustrates the condition that exists when an element 78' associated with a switch is not depressed by a clip. The element 28'''' represents a portion of the drum with the wire-like elements 76' adjacent thereto. Clip 86 is included merely to give a more complete picture of the structure. Under the conditions shown in Fig. 6, it can be seen that the armature 82 is disengaged from the normally open contact 84. It is to be noted that the switch 88 is part of the bank of switches defined herein as the first bank of switches. As can be seen from the Fig. 6, the mechanical element 100 is not exerting force against the element 98. Consequently, the armature 94 of switch 90, which is part of the second bank of switches, is closed upon the normally closed contact 92 by force of the spring 85. The normally open contact 96, which leads to the switch 27 of Fig. 1 through conductor 106 remains open. The incoming conductor 102 is then open circuited through a circuit which can be traced from conductor 102 through the armature 94 of switch 90, the contact 92 to the armature 82 of switch 88. It is to be noted that the conductor 106 corresponds to one of the conductors 35 of Fig. 1.

Fig. 7 illustrates the condition wherein the drum has been rotated so that the clip 86' is depressing the element 78'' to cause the armature 82' to make with the contact 84'. The clip 86' is formed so that although it will protrude beyond the wire-like rods 76'' far enough to cause the element 100 to move the armature 94' of switch 90' to make with contact 84', it will not depress the element 98' to cause opening of the contact 92' of the switch 90'. Thus the incoming conductor 102' is connected to ground potential through a circuit extending from conductor 102' through armature 94' of switch 90', contact 92', armature 82' of switch 88', contact 84' to ground potential. It is to be noted that contacts, such as contacts 84', constitute the plurality of second terminals mentioned in the introductory portion of the specification. If desired, the contacts, such as contact 84', can be connected to individual circuits instead of a common point (ground potential).

Fig. 8 illustrates the condition when the drum 28''''' is rotated so that the row of clips, comprised of clips such as clip 112, which protrude beyond the wire-like elements 76''' farther than the other rows of clips, is positioned to depress the element 78'''. The armature 82'' will respond thereto to close upon the contact 84''. Further, the clip 112 is designed to protrude beyond the wire-like elements far enough to cause the bar 100'' to depress the element 98'' so that the armature 94'' of switch 90'' is moved to break with contact 92'' and to make with contact 96''. The input lead 102'' is now connected to the switch 27 of Fig. 1 through the armature 94' of switch 90'', the contact 96'', and the conductor 106''.

The particular switching arrangement shown here is but one of many which can be employed with the invention. It is shown primarily as an example and is not intended to limit the scope of the invention in any manner.

Referring again to Fig. 2, the box-shaped structure 41 (with a portion thereof broken away) is the same structure as is represented by the block 27 of Fig. 1. More specifically, the structure 41 can represent a plurality of wafer switches of the type described in the aforementioned co-pending application for Letters Patent Serial Number 610,915. These wafer switches can be concentrically arranged and may comprise several rotors as, for example, rotors 43, 45, and 47. As mentioned before, wafer switches are not a part of this invention and therefore will not be described. Elements 51 comprise the terminals of the wafer switches. To these terminals 51 are connected the conductors, such as the conductors 106, 106', and 106'' of Figs. 6, 7, and 8, respectively. It is to be noted that the terminals 51 are the terminals which have hereinbefore been defined as "third terminals." The output conductors of the wafer switch 41 correspond to the conductors 25 of Fig. 1 and are not shown in the diagram of Fig. 2. Actually, such output conductors in Fig. 2 are a part of the wafer switch 41 and are connected to ground potential within the wafer switch.

The drum structure 20 (Fig. 2) is caused to rotate by means of the following structure: The control knob 63 is operable by an operator to turn the shaft 61, upon the end of which is mounted securely the bevel gear 59. Gear 59 engages bevel gear 55, which is secured to shaft 57 as is gear 53. Gear 53 engages gear 32 to turn the drum structure 20.

In Fig. 5 there is shown a view of the detent mechanism which positions the ratchet wheel 30'' which is mounted securely on one end of the drum 28'''. The bar 97 is pivoted by suitable means 65 at one end and is fastened to pin 69 at the other end by tension spring 67. The cylindrical shaft element 99, which fits between adjacent teeth of ratchet wheel 30'' to lock said wheel in given positions, is rotatable about its axis and is fastened to bar 97.

It is to be noted that the forms of the invention herein shown and described are but preferred embodiments of the same and that various changes may be made in shapes, proportions, and general structural arrangement without departing from the spirit or scope of the invention.

I claim:

1. Means for selectively actuating preselected combinations of elements of a row of elements comprising a rotatable drum positioned adjacent said row of elements, said drum having a plurality of columns of depressions arranged substantially circumferentially around the surface thereof, a plurality of wire-like members, means rotatable with said drum for mounting said wire-like members substantially parallel to the axis of said rotatable drum at substantially equal distances from the surface of said drum and at substantially equal distances from each other, a plurality of clips self-supported between and slidably engaged between adjacent ones of said wire-like members to form a plurality of rows of clips, each of said clips constructed to have one end protrude beyond the wire-like members for actuating one of said elements and to have the other end seat in one of said depressions.

2. Means for selectively actuating preselected combinations of elements of a row of elements in accordance with claim 1, in which one of said rows of clips protrudes beyond the wire-like elements farther than the other rows of clips.

3. Means for selectively actuating preselected combinations of elements of a row of elements in accordance with claim 1, comprising means for rotating said drum and means for locking said drum at spaced angular intervals equal to the angular distance between adjacent ones of said wire-like members with respect to the axis of said rotatable drum, said row of elements being positioned so each succeeding row of clips will actuate predetermined combinations of said elements in accordance with the position of said clips.

4. Means for selectively actuating preselected combinations of mechanical elements in a row of mechanical elements, said means comprising a rotatable drum positioned adjacent said row of mechanical elements and having a plurality of grooves on the surface thereof each arranged substantially circumferentially around said drum, a plurality of rod-like members, means rotatable with said drum for mounting said rod-like members substantially parallel to the axis of said rotatable drum at substantially equal distances from each other, a plurality of clips supported at one end in a slidable manner between adjacent rod-like members to form a plurality of rows of clips, said clips constructed to have one end protrude beyond the rod-like members for actuating one of said mechanical elements and to have the other end seat into one of said grooves.

5. Means for selectively actuating preselected combinations of mechanical elements in a row of mechanical elements in accordance with claim 4, in which one of said rows of clips protrudes farther between the rod-like elements than the other rows of clips.

6. Means for selectively actuating preselected combinations of switches of a row of switches comprising a rotatable drum having a plurality of columns of depressions arranged circumferentially around said drum on the surface thereof, a plurality of wire-like members, means for mounting said wire-like members substantially parallel to the axis of said rotatable drum at substantially equal distances from the surface of said drum and at substantially equal distances from each other, a plurality of spring clips self-supported between and slidably engaged between adjacent ones of said wire-like members to form a plurality of rows of rows of spring clips, each of said spring clips constructed to have one end extend out beyond the wire-like elements and the other end seat in one of said depressions, said rotatable drum and said row of switches being arranged with respect to each other so that preselected combinations of switches of said rows of switches will be actuated by successive rows of said spring clips in accordance with the position of said spring clips along said wire-like members.

7. Means for selectively actuating preselected combinations of switches of a row of switches, said means comprising a rotatable drum positioned adjacent said row of switches and having a plurality of grooves on the surface thereof each arranged circumferentially around said drum, a plurality of wire-like members, means rotatable with said drum for mounting said wire-like members substantially parallel to the axis of said rotatable drum at substantially equal distances from the surface of said drum and at substantially equal distances from each other, a plurality of spring clips spring-supported at one end in a slidable manner between adjacent wire-like members to form a plurality of rows of spring clips, said spring clips constructed to have one end protrude beyond the wire-like members and to have the other end seat into one of said grooves, said rotatable drum and said row of switches arranged with respect to each other so that preselected combinations of switches of said row of switches will be actuated by successive rows of said spring clips in accordance with the position of said clips along said wire-like members.

8. Means for selectively actuating preselected combinations of switches of a row of switches in accordance with claim 7, in which one of said rows of spring clips protrudes farther between the wire-like members than the other rows of spring clips.

9. Means for selectively actuating preselected combinations of switches of a row of switches in accordance with claim 8, comprising means for rotating said rotatable drum and means for locking said drum at spaced angular intervals equal to the angular distance between adjacent ones of said wire-like members with respect to the axis of said rotatable drum, said row of switches being positioned so each succeeding row of spring clips will actuate predetermined combinations of switches of said row of switches in accordance with the position of said spring clips.

10. Adjustable tab means comprising a surface having a row of depressions therein, at least one pair of wire-like members positioned substantially parallel to said row of depressions and to each other, and at least one clip self-supported between and slidably engaged between said pair of wire-like members, said clip constructed to have one end formed into a tab which protrudes between the wire-like members and to have the other end seat in one of said depressions.

11. Adjustable tab means in accordance with claim 10, in which said one end of said clip is constructed to be substantially U shaped with the closed end of the U protruding beyond the wire-like members and the open ends of the U being formed to have depressions therein by means of which said clip is firmly held between said pair of wire-like members.

12. Adjustable tab means comprising a surface having a plurality of grooves therein arranged side by side and substantially parallel to each other, at least one pair of substantially parallel wire-like members positioned substantially perpendicular to said grooves, and at least one clip self-supported between and slidably engaged between said pair of wire-like members, said clip constructed to have one end protrude between the wire-like members and to have the other end seat in one of said grooves.

13. Adjustable tab means in accordance with claim 12, in which said one end of said clip is constructed to be substantially U shaped with the closed end of the U protruding beyond the wire-like members and the open ends of the U being formed to have depressions therein by means of which said clip is firmly held between said pair of wire-like members.

14. In combination with a plurality of first switches constructed when closed to connect individual terminals of a plurality of first terminals to individual terminals of a plurality of second terminals, and a plurality of second switches constructed when closed to disconnect said plurality of first terminals from said plurality of second terminals and to connect said plurality of first terminals to a plurality of third terminals, selector means positioned adjacent said plurality of first switches and said plurality of second switches and having a plurality of positions, said selector means constructed and arranged to cause preselected combinations of said plurality of first switches to be closed in accordance with the particular position of said selector means, said plurality of second switches being responsive to said selector means to become closed when said selector means is in a given position, said selector means comprising a rotatable drum having a plurality of grooves each arranged substantially circumferentially around said drum on the surface thereof, a plurality of wire-like members, means for mounting said wire-like members substantially parallel to the axis of said rotatable drum at substantially equal distances from the surface of said drum and at substantially equal distances from each other, a plurality of clips self-supported between and slidably engaged between adjacent ones of said wire-like members to form a plurality of rows of clips, each of said clips constructed to have one end protrude out beyond the wire-like elements and to have the other end seat in a given one of said grooves, the said selector means being arranged so that the protruding ends of said clips will actuate preset combinations of switches of said plurality of first and second switches in accordance with the position of said selector means and the positions of said clips, the row of clips that actuate said plurality of second switches when said rotatable drum is in said given position being constructed to protrude beyond said wire-like elements a different distance than the other rows of clips.

15. A combination in accordance with claim 14, comprising means for rotating said rotatable drum and means for locking said rotatable drum at spaced angular intervals equal to the angular distance between adjacent wire-like members with respect to the axis of said rotatable drum.

16. In combination with a plurality of first switches constructed when closed to connect individual terminals of a plurality of first terminals to individual terminals of a plurality of second terminals, and a plurality of second switches constructed when closed to disconnect said plurality of first terminals from said plurality of second terminals and to connect said plurality of first terminals to a plurality of third terminals, selector means positioned adjacent said plurality of first switches and said plurality of second switches and having a plurality of positions, said selector means constructed and arranged to cause preselected combinations of said plurality of first switches to be closed in accordance with the particular position of said selector means, said plurality of second switches being responsive to said selector means to become closed when said selector means is in a given position, said selector means comprising a rotatable drum having a plurality of columns of depressions on the surface thereof, each of said columns of depressions being arranged substantially circumferentially around said drum, a plurality of wire-like members, means for mounting said wire-like members substantially parallel to the axis of said rotatable drum at substantially equal distances from the surface of said rotatable drum and at substantially equal distances from each other, a plurality of clips self-supported between and slidably engaged between adjacent ones of said wire-like members to form a plurality of rows of clips, each of said clips constructed to have one end protrude out beyond the wire-like elements and to have the other end seat in a given one of said depressions, the said selector means being positioned so that the protruding ends of said clips will actuate preset combinations of switches of said plurality of first and second switches in accordance with the position of said selector means and the positions of said clips, the row of clips that actuate said plurality of second switches when said rotatable drum is in said given position being constructed to protrude beyond said wire-like elements a different distance than the other rows of clips.

17. A combination in accordance with claim 16, comprising means for rotating said rotatable drum and means for locking said rotatable drum at spaced angular intervals equal to the angular distance between adjacent wire-like members with respect to the axis of said rotatable drum.

18. Control means comprising a plurality of first switching means constructed when closed to connect individual ones of a plurality of first terminals to a given electrical point, selector means positioned adjacent said plurality of first switching means and having a plurality of positions, said selector means constructed and arranged to cause preselected combinations of said first switching means to be closed in accordance with the particular position of said selector means, and second switching means constructed and arranged to be responsive to a given position of said selector means to disconnect said plurality of first terminals from said given electrical point and to connect individual ones of said plurality of first terminals to individual ones of a plurality of second terminals, said selector means comprising a rotatable drum having a plurality of columns of depressions on the surface thereof, each of said columns of depressions being arranged substantially circumferentially around said rotatable drum, a plurality of wire-like members, means for mounting said wire-like members substantially parallel to the axis of said rotatable drum at substantially equal distances from the surface of said rotatable drum and at substantially equal distances from each other, a plurality of clips self-supported between and slidably engaged between adjacent ones of said wire-like members to form a plurality of rows of clips, each of said clips constructed to have one end protrude beyond the wire-like elements and to have the other end seat in a given one of said depressions, said selector means being positioned so that the individual switches of said first and second pluralities of switches will be closed by the protruding portions of said clips, the row of clips which actuate said second switching means when said selector means is in said given position being constructed to protrude beyond said wire-like members farther than the other rows of clips.

19. Control means in accordance with claim 18, comprising means for rotating said rotatable drum and means for locking said rotatable drum at spaced angular intervals equal to the angular distance between adjacent wire-like members with respect to the axis of said rotatable drum.

20. Control means for automatically and manually connecting selected ones of a plurality of first conductors to selected ones of a plurality of second conductors comprising a selector means having a plurality of discrete positions, said selector means comprising a rotatable drum having a plurality of grooves on the surface thereof each arranged circumferentially around said drum, a plurality of wire-like members, means for mounting said wire-like members substantially parallel to the axis of said rotatable drum at substantially equal distances from the surface of said rotatable drum and at substantially equal distances from each other, a plurality of spring clips spring-supported at one end in a slidable manner between adjacent wire-like members to form a plurality of rows of spring clips, said spring clips constructed to have one end protrude beyond the wire-like members and to have the other end seat in one of said grooves, first switching means constructed and arranged to be actuated by the protruding portions of said clips in selectable rows of clips determined by the position of said selector means to automatically connect preselected groups of said plurality of first conductors to preselected groups of said plurality of second conductors, second switching means constructed to respond to a given position of said selector means to cause said plurality of first conductors to become disconnected from said plurality of second conductors and to become connected to a plurality of third conductors, the spring clips of said row of clips which actuate said second switching means when said selector means is in said given position being constructed to protrude beyond the wire-like elements farther than the other rows of clips.

21. Control means in accordance with claim 20, comprising means for rotating said rotatable drum and means for locking said rotatable drum at spaced angular intervals equal to the angular distance between adjacent wire-like members with respect to the axis of said rotatable drum.

22. Control means for automatically and manually connecting selected ones of a plurality of first conductors to selected ones of a plurality of second conductors comprising a selector means having a plurality of discrete positions, said selector means comprising a rotatable drum having a plurality of grooves on the surface thereof each arranged circumferentially around said rotatable drum, a plurality of wire-like members, means for mounting said wire-like members substantially parallel to the axis of said rotatable drum at substantially equal distances from the surface of said rotatable drum and at substantially equal distances from each other, a plurality of spring clips spring-supported at one end in a slidable manner between adjacent wire-like members to form a plurality of rows of spring clips, said spring clips constructed to have one end protrude beyond the wire-like members and to have the other end seat in one of said grooves, first switching means constructed and arranged to be actuated by the protruding portions of said clips in selectable rows of clips determined by the position of said selector means to automatically connect preselected groups of said plurality of first conductors to preselected groups of said plurality of second conductors, second switching means, third switching means constructed to respond to a given position of said selector means to cause said plurality of first conductors to become disconnected from said plurality of second conductors and to become connected to said second switching means, said second switching means constructed and arranged to be manually operable to selectively connect individual ones of said plurality of first conductors to individual ones of said plurality of second conductors.

References Cited in the file of this patent

UNITED STATES PATENTS

| | | |
|---|---|---|
| 284,114 | Blodgett | Aug. 28, 1883 |
| 2,163,864 | Bissell | June 27, 1939 |
| 2,544,409 | Yonash | Mar. 6, 1951 |
| 2,691,081 | Weber | Oct. 5, 1954 |
| 2,748,208 | Koertge | May 29, 1956 |